United States Patent [19]

Campbell et al.

[11] Patent Number: 4,481,016
[45] Date of Patent: Nov. 6, 1984

[54] METHOD OF MAKING TOOL INSERTS AND DRILL BITS

[76] Inventors: Nicoll A. D. Campbell, 54 Kerry Rd., Parkview, Johannesburg, Transvaal; Henry B. Dyer, 28 George St., Bryanston, Sandton, Transvaal; Rainer Dietrich, 101, 6th St., Linden, Johannesburg, Transvaal; Cornelius Phaal, 14 Robant La., Rivonia, Sandton, Transvaal, all of South Africa; Douglas J. Reid, 97 Tradaree Ct., Shannon, County Clare, Ireland

[21] Appl. No.: 325,661

[22] Filed: Nov. 30, 1981

Related U.S. Application Data

[63] Continuation of Ser. No. 65,324, Aug. 9, 1979, abandoned.

[30] Foreign Application Priority Data

Aug. 18, 1978 [ZA] South Africa .................. 78/4716
Dec. 19, 1978 [ZA] South Africa .................. 78/7087
Dec. 27, 1978 [ZA] South Africa .................. 78/7291
Feb. 21, 1979 [ZA] South Africa .................. 79/0814

[51] Int. Cl.³ ............................................. B24B 1/00
[52] U.S. Cl. ................................. 51/295; 51/293; 51/307; 51/309; 51/DIG. 30
[58] Field of Search .............. 51/293, 295, 307, 309, 51/298, DIG. 30

[56] References Cited

U.S. PATENT DOCUMENTS

| | | | |
|---|---|---|---|
| 2,194,472 | 3/1940 | Jackson .................. | 51/298 |
| 2,939,941 | 6/1960 | Heerschap et al. ........ | 219/69 M |
| 3,481,723 | 12/1969 | Kistler et al. ........... | 51/298 |
| 3,859,407 | 1/1975 | Blanding et al. ......... | 51/309 |
| 3,929,432 | 12/1975 | Caveney ................. | 51/295 |
| 4,063,909 | 12/1977 | Mitchell ................ | 51/309 |
| 4,098,362 | 7/1978 | Bonniee ................. | 175/329 |
| 4,099,935 | 7/1978 | Bond et al. ............. | 51/309 |
| 4,103,137 | 7/1978 | Levitt et al. ........... | 219/69 W |
| 4,156,329 | 5/1979 | Daniels et al. .......... | 51/295 |

OTHER PUBLICATIONS

E. D. Vaks, B. M. Sokolov, Machines & Tooling, vol. 48, No. 9, 1977, pp. 48–49.
Kirk-Othmer, Encyclopedia of Chemical Technology, vol. 4, 3rd ed., 1978, pp. 676–688.

Primary Examiner—Paul Lieberman
Assistant Examiner—W. Thompson
Attorney, Agent, or Firm—Michael N. Meller

[57] ABSTRACT

A method of making inserts suitable for tool or drill bits which includes the step of fragmenting, e.g. by means of a laser beam, an abrasive compact in a plurality of discrete, non-segmental fragments. The inserts may have a variety of shapes, some of which are new, such as conical, truncated conical or truncated pyrimidal. The inserts are particularly useful for wire-drawing die blanks and core or oil-well drill bits.

2 Claims, 7 Drawing Figures

U.S. Patent Nov. 6, 1984 Sheet 1 of 2 4,481,016
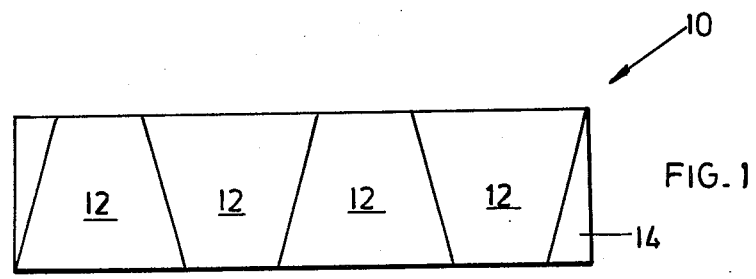
FIG. 1
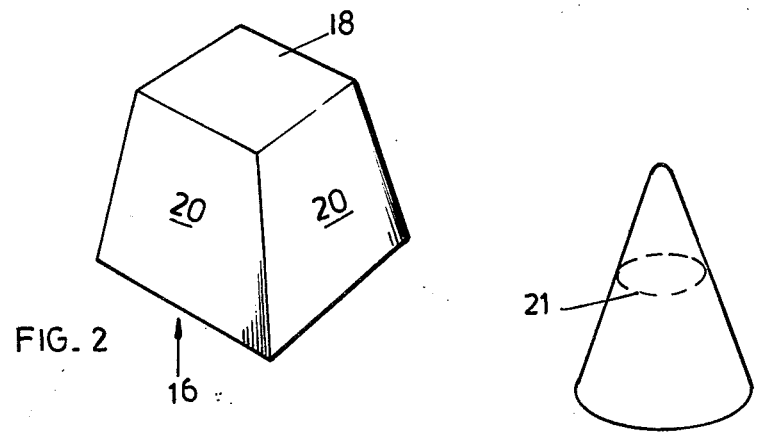
FIG. 2
FIG. 3
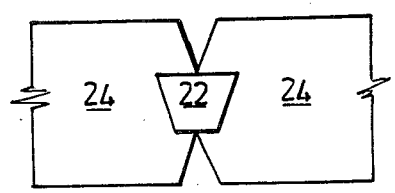
FIG. 4
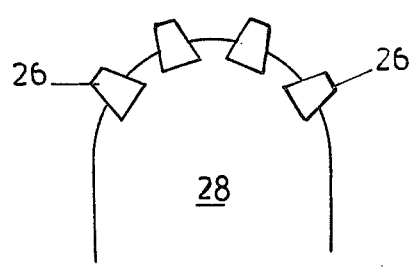
FIG. 5

METHOD OF MAKING TOOL INSERTS AND DRILL BITS

This application is a continuation of application Ser. No. 65,324, filed Aug. 9, 1979 now abandoned.

This invention relates to a method of making inserts suitable for tools and drill bits.

According to the invention, there is provided a method of making inserts suitable for tools or drill bits including the step of fragmenting an abrasive compact into a plurality of discrete, nonsegmental fragments. The fragments are of non-segmental shape, i.e. they have a shape essentially other than that of a segment of a circle. The fragments are typically cylindrical, cubic, conical truncated conical or truncated pyramidal in shape. Abrasive compact inserts having the latter three shapes are new and provide another aspect of the invention.

The fragments produced by the above method may be used for a variety of tools for example wire-drawing die blanks. In the case of wire-drawing die blanks, the fragment will be surrounded by a metal or cemented carbide support in known manner such as that described in U.S. Pat. No. 4,144,739. A fragment having a truncated pyramidal or truncated conical shape is particularly suitable in this application.

The fragments may also be used for core or oil-well drill bits. The drill bit will consist of a number of the inserts mounted in a metal matrix.

The fragments, or at least one of them, may have, in plan, a quadrilateral shape including at least one angle of or about 90°. This 90° angle provides, in use, a cutting point. Preferably, the quadrilateral also includes an angle of or about 135° in the corner remote from the 90° angle and two angles each of or about 67.5°.

The inserts or fragments, particularly those of conical shape, may be used in dresser tools.

The compacts are typically fragmented by cutting them by spark erosion or with a laser beam where tight tolerances can be achieved. The technique for spark erosion is already taught in Levitt et al., U.S. Pat. No. 4,103,137 and Heerschap et al., U.S. Pat. No. 2,939,941. Laser cutting is taught in the Soviet reference 1335A Machines and Tooling, Vol. 48, No. 9, (1977.09) by Vaks et al. Another way in which the compacts may be fragmented is to produce a compact bonded to a support, such as a carbide support, the interface between the diamond and support having a plurality of ridges or protrusions of the support defining a desired fracture pattern and projecting into the compact. The support is then removed, e.g. by grinding, leaving a compact having a pattern of zones of weakness defined by the ridges or protrusions. The compact can be fractured along the zones of weakness to produce the fragments.

The inserts or fragments may be rounded to a substantially spheroidal or ovalised shape to produce drill particles. Rounding may be achieved, for example, in a standard microniser. The rounded fragments are preferably provided with a flash of titanium, the flash generally being present in an amount of up to 3 percent by weight of the rounded fragment. The surface of the rounded fragments may be etched, for example with an acid, to leach out metal and provide the rounded fragment with a roughened surface. Better keying either to the titanium flash or to the metal bond of the drill is achieved. These rounded fragments may be used to replace natural processed drill stones which are becoming scarcer and scarcer.

The compact may be any suitable compact known in the art, particularly a diamond or a cubic boron nitride compact. Such compacts, as is well known in the art, consist essentially of a polycrystalline mass of abrasive particles, generally present in an amount of at least 70 percent, preferably 80 to 90 percent, by volume of the compact, bonded into a hard conglomerate.

Abrasive compacts, particularly diamond and cubic boron nitride compacts, may be self bonded, i.e. individual particles of the compact may be fused and bonded together without the aid of a metal or like bonding matrix. Alternatively, stronger and more durable compacts are produced when there is a suitable bonding matrix present.

In the case of cubic boron nitride compacts, i.e. compacts in which the abrasive particle is predominantly cubic boron nitride, the bonding matrix, when provided, preferably contains a catalyst (also known as a solvent) for cubic boron nitride growth such as aluminium or an alloy of aluminium with nickel, cobalt, iron, manganese or chromium. Such catalysts tend to be soft and to minimise smearing of the catalyst during any use of the compact it is preferred that the matrix also includes a ceramic such as silicon nitride which is capable of reacting with the catalyst to produce a hard material.

In the case of diamond compacts, i.e. compacts in which the abrasive particle is predominantly diamond, the bonding matrix, when provided, preferably contains a solvent for diamond growth. Suitable solvents are metals of Group VIII of the Periodic Table such as cobalts, nickel or iron or an alloy containing such a metal.

For diamond and cubic boron nitride compacts the presence of a solvent or catalyst for the particular abrasive being used in the compact is desirable because then under the conditions necessary for the manufacture of such compacts intergrowth between the particles occurs. As is known in the art, diamond and cubic boron nitride compacts are generally manufactured under conditions of temperature and pressure at which the abrasive particle is crystallographically stable.

The inserts may be provided with a backing such as a cemented carbide backing in the manner described and illustrated in British patent specifications Nos. 1,349,385, 1,407,393 and 1,489,130.

Embodiments of the invention will now be described in reference to the accompanying drawings, in which:

FIG. 1 illustrates, in side elevation, a method of fragmenting a compact;

FIGS. 2 and 3 illustrate typical inserts of the invention;

FIG. 4 is a fragmentary side elevation of an insert forming part of a wire-drawing die blank;

FIG. 5 is a schematic side view of a drill bit incorporating inserts of the invention;

Figure 6:
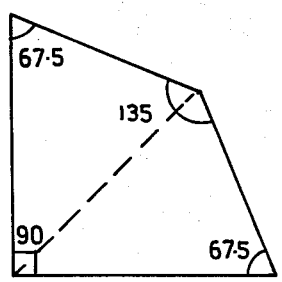
FIG. 6 is a plan view of another typical insert of the invention.

Referring to FIG. 1, the inserts may be made by suitably cutting a disc-shaped compact into a plurality of such inserts. A disc-shaped compact 10 is made in the conventional manner. This disc is then cut in a series of intersecting cuts one direction of which is illustrated by FIG. 1 to produce a number of inserts 12. There will inevitably be a certain amount of off-cut 14. The cutting is preferably achieved by means of a laser beam.

Typical inserts produced by the method of the invention are illustrated by FIGS. 2 and 3 of the accompanying drawings. Referring to FIG. 2, it can be seen that the insert has a bottom 16 and a top 18 which is smaller in cross-sectional area than the bottom 16. The top 18 and bottom 16 are joined by sloping surfaces 20. FIG. 3 illustrates an insert of conical shape. The insert may be truncated along dotted line 21 to produce an insert of truncated conical shape.

Figure 7:
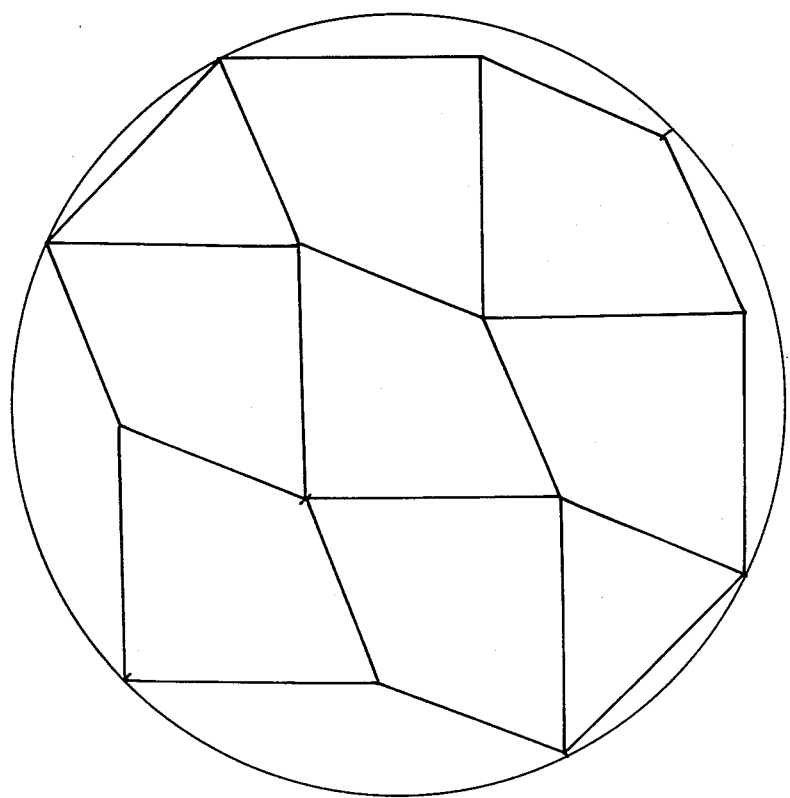
FIG. 7 illustrates, in plan, a method of fragmenting an abrasive compact to produce fragments of the type illustrated by FIG. 6.

Another typical fragment or insert of the invention is illustrated in plan in FIG. 6. A number of such inserts may be cut from a disc-shaped or circular compact illustrated by FIG. 7. Indeed, it will be noted from FIG. 6 that seven such bodies of quadrilateral shape can be produced leaving two useful triangular shaped bodies and little wastage. Fragments of the FIG. 6 configuration are typically cut from large circular compacts, i.e. compacts having a diameter of about 12 mm or larger, e.g. 12.7 mm in diameter.

The inserts produced by the method of the invention may be mounted in a metal or cemented carbide surround to provide a wire-drawing die blank. An example of such a blank is illustrated in side elevation by FIG. 4 of the attached drawings. Referring to this Figure, it can be seen that the insert 22 is mounted in a supporting surround 24. The mounting of the insert in the support and the bonding of the insert to the support may be achieved in any known manner. For use, a centrally located hole extending through the insert is provided. The direction of wire-drawing is from the large end to the narrow end.

The surround, as mentioned above, may be metal or cemented carbide. When it is metal it it usually a suitable steel. When it is a cemented carbide, it is usually a cemented tungsten carbide, cemented titanium carbide or cemented tantalum carbide. As is known in the art, cemented carbides consist of a mass of carbide particles bonded into a coherent, hard mass by means of a metal bonding medium. The metal bonding medium is usually provided in an amount of 6 to 35 percent by weight of the carbide and is usually cobalt, nickel or iron.

A drill bit 28 incorporating a plurality of inserts 26 is illustrated by FIG. 5. The tapered configuration minimises pull-out of the inserts. The matrix of the drill bit may be machined in such a way that the inserts may be slotted into cavities machined in the bit and thereafter brazed, if necessary.

The inserts produced by the method of the invention may also be mounted in a suitable support and used as dresser tools.

We claim:

1. A wire-drawing die insert comprising an abrasive compact fragment selected from the group consisting of diamond and cubic boron nitride in the shape of a truncated pyramid or a truncated cone and having a centrally located hole extending from the base to the truncated apex and suitably embedded in a metal or cemented carbide support so that the direction of wire drawing will be from the base to the truncated apex.

2. A drill bit comprising a plurality of fragments of abrasive compact selected from the group consisting of diamond and cubic boron nitride in the shape of a truncated pyramid or a truncated cone with the base of each fragment suitably mounted in a metal matrix.

* * * * *